United States Patent [19]
Ohaus

[11] Patent Number: 5,139,833
[45] Date of Patent: Aug. 18, 1992

[54] EMBEDDED BRACKET

[75] Inventor: Karl G. Ohaus, Chatham, N.J.

[73] Assignee: American Standard Inc., New York, N.Y.

[21] Appl. No.: 467,384

[22] Filed: Jan. 19, 1990

[51] Int. Cl.$^5$ ............... B29D 22/00; A47K 3/02; A47K 3/22
[52] U.S. Cl. ............... 428/35.7; 428/35.8; 4/655; 4/648; 4/584; 4/592; 4/541.1
[58] Field of Search ............ 428/35.8, 35.7, 99, 428/36.92; 4/191, 192, 655, DIG. 18, 648, 170, 584, 592, 544

[56] References Cited

U.S. PATENT DOCUMENTS 3,123,403  3/1964  Hood .................. 297/212
4,142,337  3/1979  Holcomb ............... 52/169.7

FOREIGN PATENT DOCUMENTS 2040676  9/1980  United Kingdom .

Primary Examiner—James J. Seidleck
Assistant Examiner—Charles R. Nold
Attorney, Agent, or Firm—Blum Kaplan

[57] ABSTRACT

A molded article having an embedded bracket, such as a whirlpool tub, the mold and a method of molding the article are disclosed. The article includes a rigid shell having a non-finish side and a finish side. The non-finish side is coated with a polymeric material. The polymeric material encloses a bracket and distributes the weight of an attached object, such as a whirlpool motor, over adjacent polymeric material. The bracket is affixed to the rigid shell in a spaced relationship and includes a surface for attaching to an object by attachment means such as a blind bolt. The bracket may also be affixed to the rigid shell by supports which are welded to the rigid shell.

16 Claims, 10 Drawing Sheets

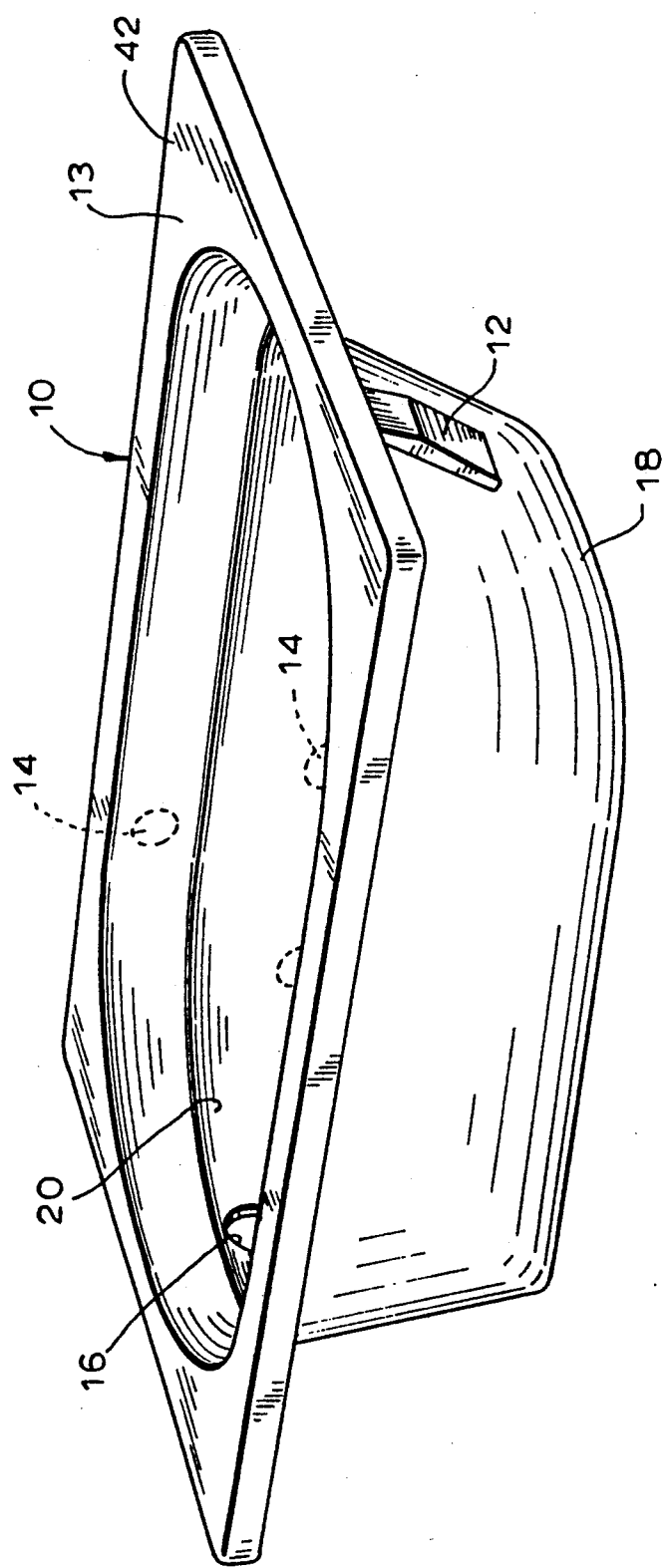

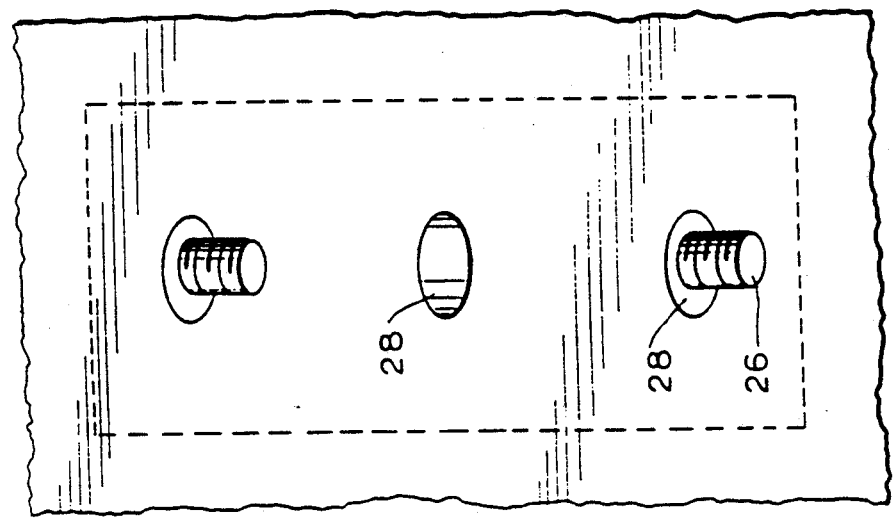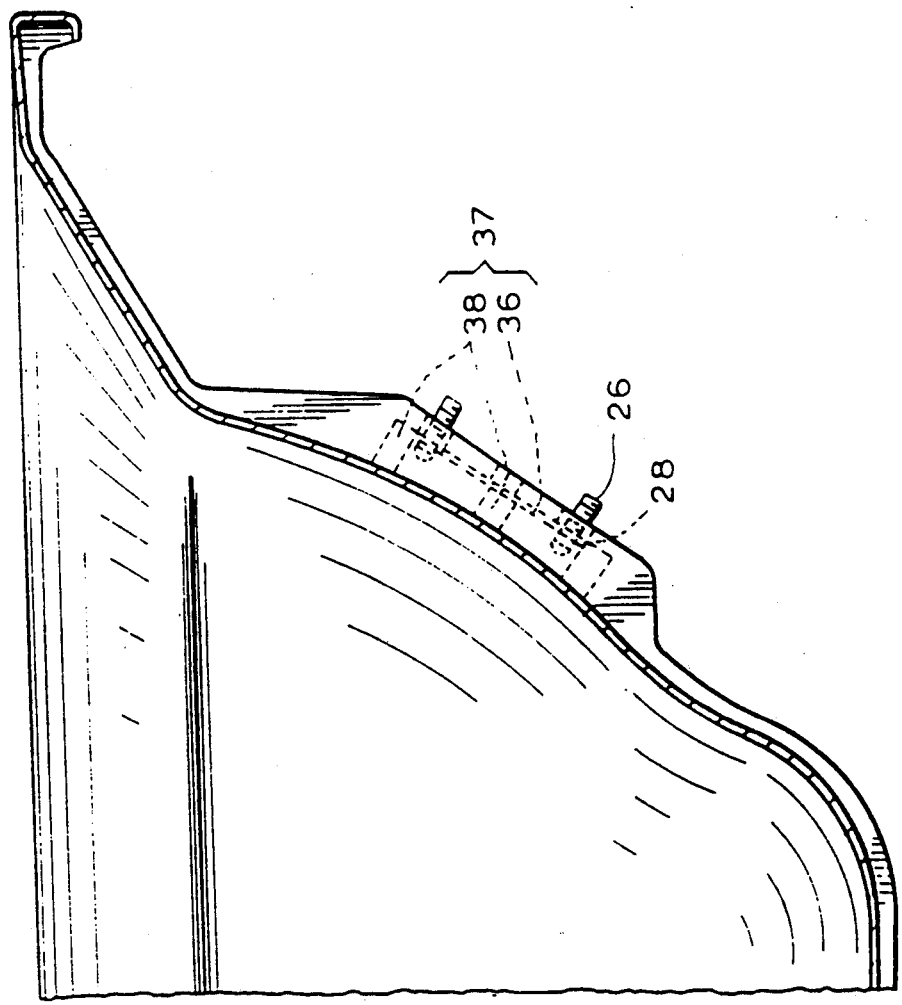

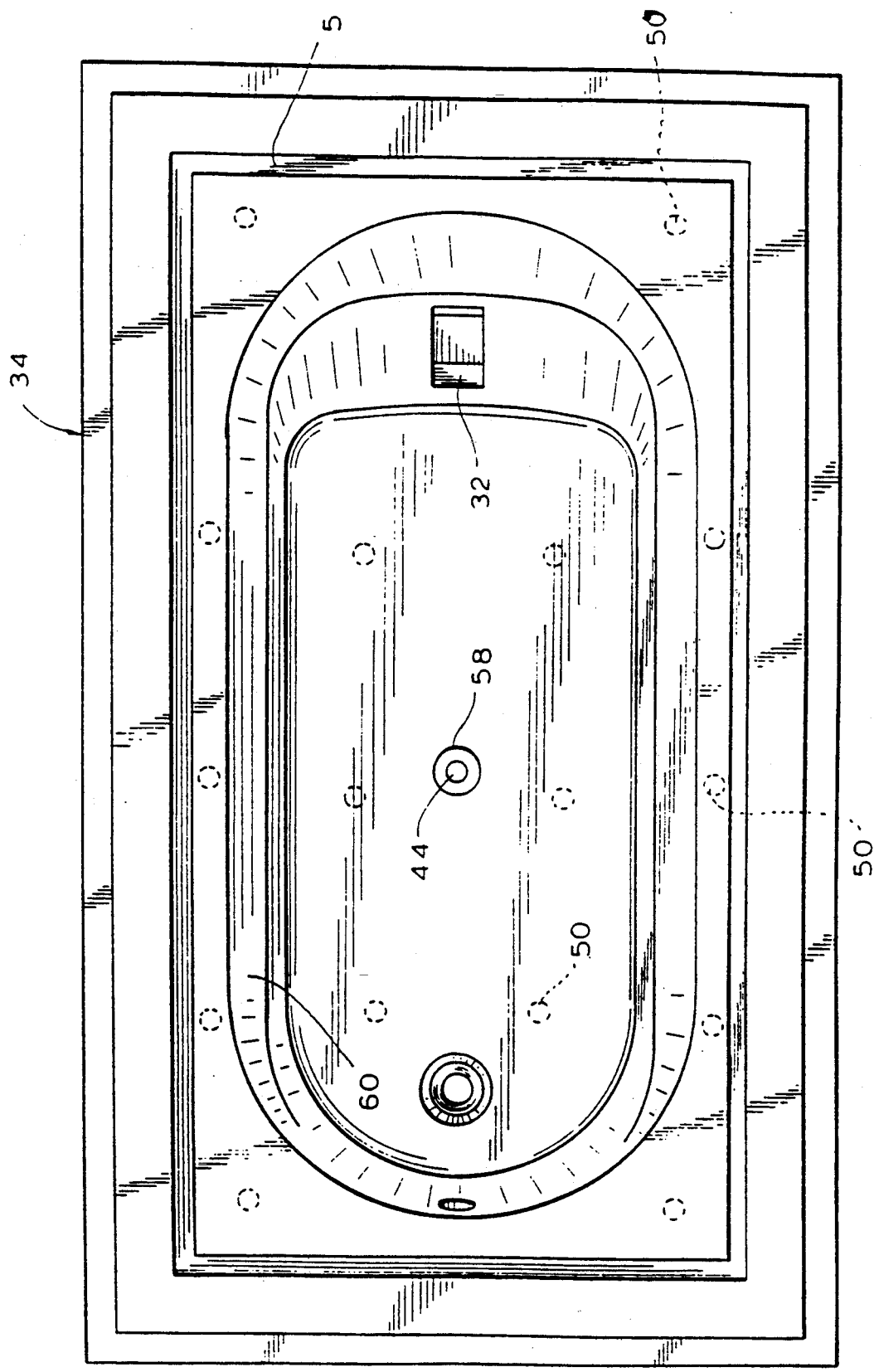

EMBEDDED BRACKET

BACKGROUND OF THE INVENTION

1. Field of the Invention

The present invention relates to sanitary fixtures such as whirlpool tubs or bathtubs which include an embedded bracket and a method and mold for making the same.

2. Background of the Related Art

In the development of sanitary fixtures, such as bathtubs, spas and whirlpool tubs, motors and other objects have been directly attached to the shell. A number of problems have been encountered. Shells for bathtubs, spas and whirlpools are usually thin. Thus, their ability to maintain a heavy load without deformation of the shell, and/or delamination of the shell's finish or support is limited. Additionally, when motors are mounted directly to the shell, vibrations can be carried directly to the tub.

U.S. Pat. No. 4,142,337 to Holcomb describes a hydrotherapy spa which is made by shooting or spraying a liquid resin, such as an epoxy, onto the inside of a mold and then embedding glass fibers into the surface of the resin. The shell has a plurality of openings for mounting devices such as lights. However, such a structure would still be subject to wear and vibration if a motor or other heavy object would be attached to the shell of the spa.

Italian Patent No. 494,712 discloses a tub having a support leg from which support brackets are directly mounted. The support brackets are used to mount a motor which is connected by a pulley to a turbulence device. The turbulence device is directly mounted to the bottom of the tub. The tub of Italian Patent No. 494,712, however, suffers from the previously mentioned problems of deformation, delamination and vibration.

Italian Patent 532,405 discloses a tub in which a mounting bracket is formed as an integral part of the tub. The tub appears to be made from a thick, cast iron or other heavy, solid material. Accordingly, the problems associated with mounting of a motor to a thin shell would not arise.

Accordingly, none of the related art describes a method for encapsulating a mounting bracket within a solid rigid polymeric material to the side of a thin rigid shell for the purpose of distributing the weight of an attached object over adjacent polymeric material, and minimizing vibration or delamination of the shell and adjacent polymeric material.

It is therefore an object of the present invention to provide an embedded bracket for supporting an object which distributes the weight of an attached object over the adjacent polymeric material while avoiding the problems of distortion, vibration and delamination of the thin shell and polymeric material which are associated with the related art.

SUMMARY OF THE INVENTION

These and other objects are achieved by the present invention which provides a molded article having an embedded bracket, such as a whirlpool tub, and a method of molding the article. The embedded bracket includes a means for attachment of an object, such as a whirlpool motor, to the molded tub. The molded tub includes a rigid shell having a non-finish side and a finish side. The non-finish side of the rigid shell is coated with a polymeric material which also encloses the bracket and forms a positive draft angle. The polymeric material enclosing the bracket distributes the weight of the attached object over adjacent polymeric material. Preferably, the rigid shell is constructed of steel or stainless steel. The bracket is attached to the rigid shell by a plurality of supports which are welded to the rigid shell. Preferably, the bracket is constructed from steel. The preferred attachment means is a blind bolt which is attached to the bracket and may be attached to an object.

The molded tub of the present invention is made with a mold receptor adapted to receive a rigid shell leaving a void between the non-finish side of the rigid shell and a side of the mold receptor. The mold receptor is also adapted for receiving a bracket and molding polymeric material about the bracket and rigid shell. The recess is adapted to mold polymeric material about the bracket at a positive draft angle with the mold receptor. The mold receptor has a recess for molding about the bracket. A male mold closing means is adapted for removably engaging the finish side of the rigid shell and sealably retaining the rigid shell to the mold receptor. The mold receptor is coated with a non-stick material such as a releasing agent, Teflon coating, wax coating or a silicon coating.

In the process of making the molded tub of the present invention, a rigid shell is loaded onto the mold receptor leaving a void between the mold receptor and a side of the rigid shell. The rigid shell has a finish side, a non-finish side and a bracket for affixation to the non-finish side. Preferably, the bracket is affixed to the rigid shell by welding a plurality of supports to the rigid shell. A polymeric material is introduced into the void, coating the non-finish side, embedding the bracket in polymeric material and affixing the bracket to the non-finish side to form a molded article such as a whirlpool tub or bathtub. The molded tub is removed from the mold receptor after the polymeric material has sufficiently hardened. An aperture is bored through the bracket and polymeric material and a means for attaching an object such as a whirlpool motor is positioned in the bore. Preferably, a blind bolt is used as a means for attaching the object.

For a better understanding of the present invention, reference is made to the following description, taken in conjunction with the following figures, the scope of which is pointed out in the appended claims.

BRIEF DESCRIPTION OF THE DRAWINGS

FIG. 1A is a perspective view of a molded whirlpool tub with an embedded bracket, according to the present invention.

FIG. 2B is an enlarged fragmentary view of the bracket illustrated in FIG. 2A.

FIG. 2C is an enlarged plan view of the bracket illustrated in FIG. 2B detailing the blind bolts.

FIG. 4C is a top plan view of the mold receptor illustrated in FIG. 4B.

DETAILED DESCRIPTION OF THE PREFERRED EMBODIMENTS

Figure 1B:
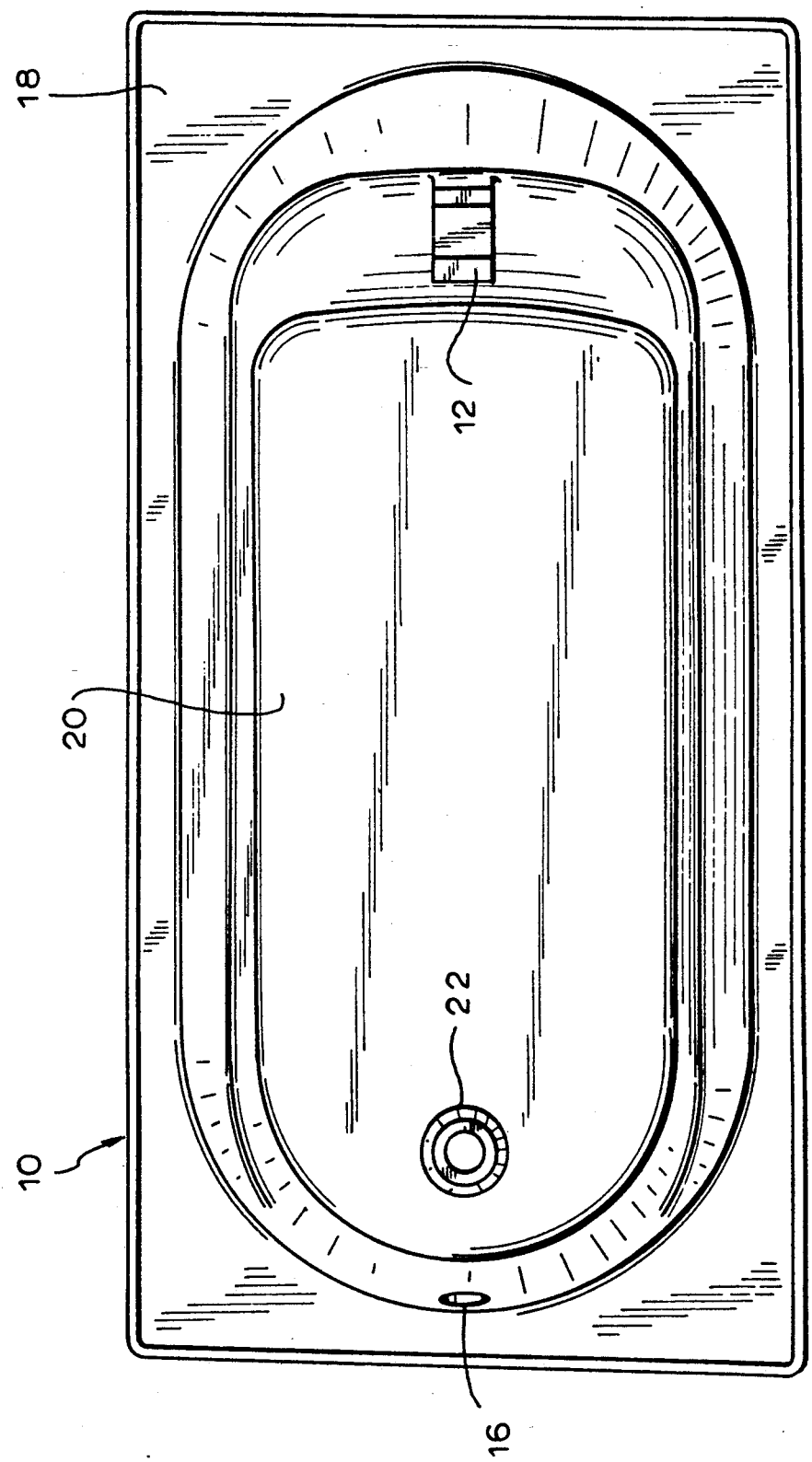
FIG. 1B is a bottom plan view of the molded whirlpool tub illustrated in FIG. 1A.
Figure 1C:
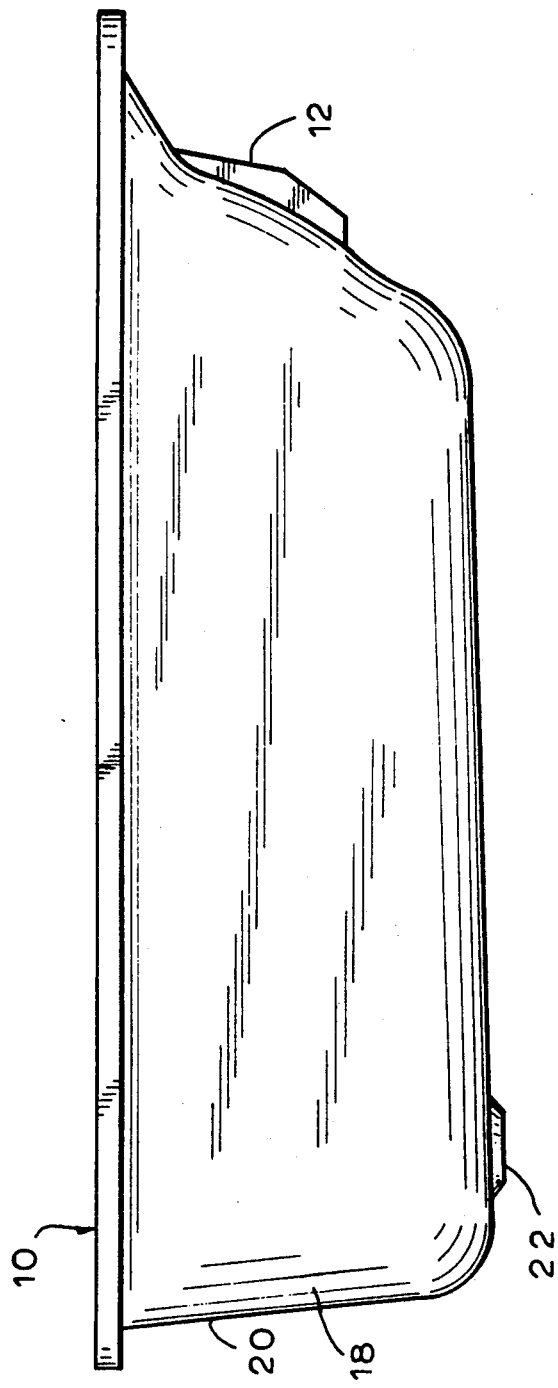
FIG. 1C is a side elevational view of the whirlpool tub illustrated in FIG. 1A.
Figure 1D:
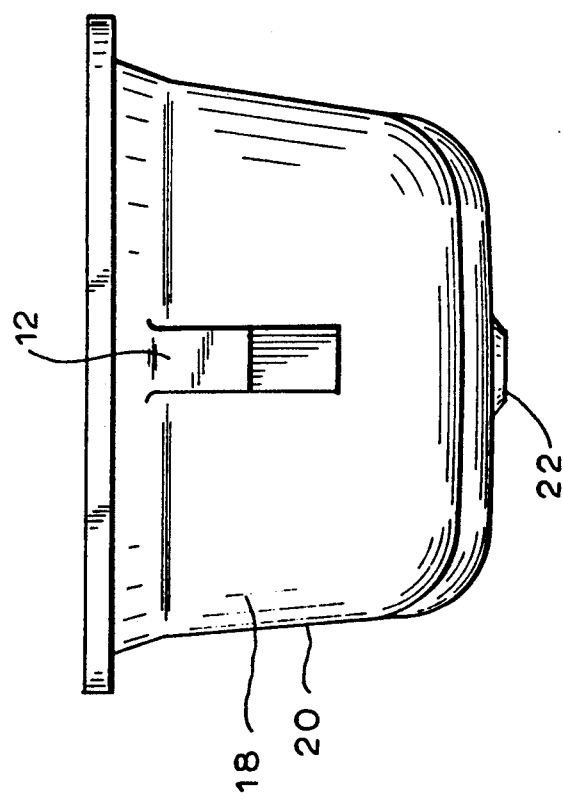
FIG. 1D is a rear elevational view of the molded whirlpool tub illustrated in FIG. 1A.
Figure 2A:
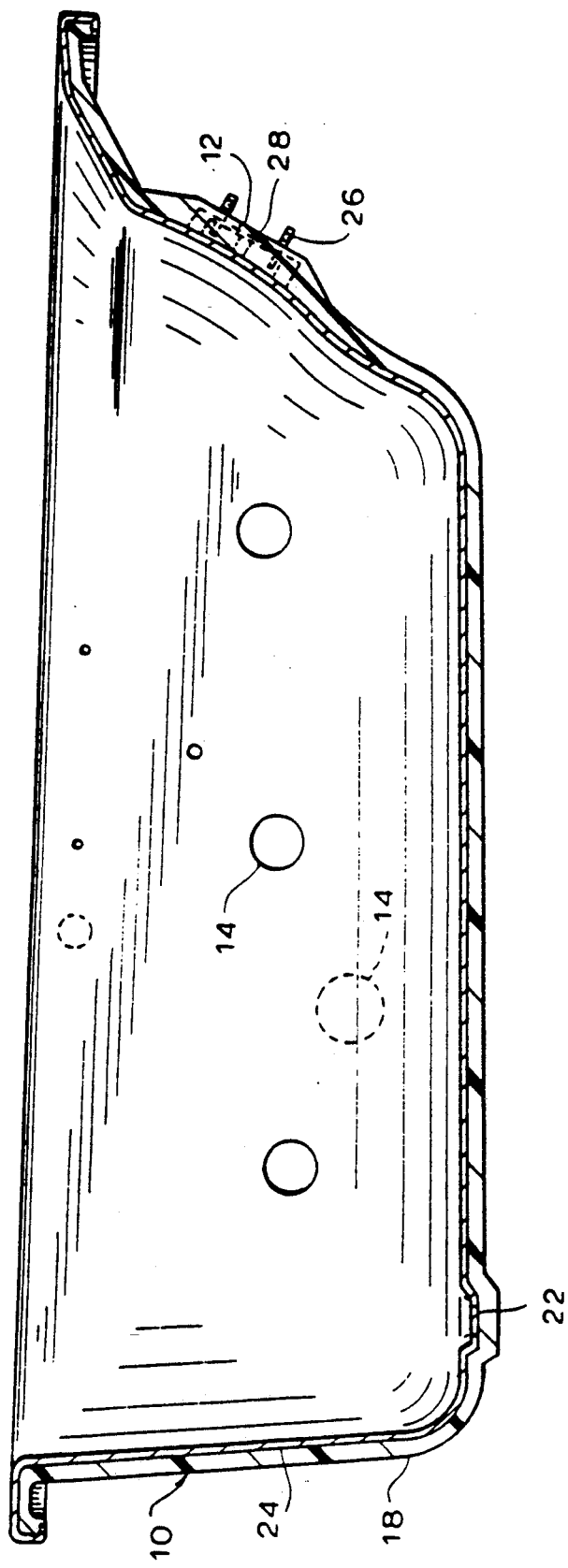
FIG. 2A is a longitudinal, vertical cross-sectional, side elevational view of the molded whirlpool tub illustrated in FIG. 1A.

A molded tub 10 in accordance with the present invention is shown in FIGS. 1A through 2C. The molded tub 10 includes an embedded bracket 12 for attachment of an object. In the embodiment illustrated herein, it is contemplated that the object is a whirlpool motor. However, the present invention is not limited to attaching a whirlpool motor to a whirlpool tub, but may be used to attach any other object to a molded article having the embedded bracket 12 of the present invention. For example, the bracket may be used to attach the tub to a wall, floor or other support. In addition, the bracket may be used to attach a sink or other object to a garbage disposer, drain, pump or any other object. As shown in FIGS. 2A–3B bracket 37 includes a surface 36 for attaching to the object by using an attachment means such as blind bolt 26. The preferred blind bolt 26 is available from the Camloc Division of Rexnord, Inc., Hasbrouk Heights, N.J. Alternatively, the attachment means may be a threaded protrusion, threaded aperture, sheet metal screw or bayonet fitting. Accordingly, the molded article may include any sanitary fixture such as, but not limited to a sink, bathtub, whirlpool tub or therapeutic tub.

The molded tub 10 includes a rigid shell 24 having a non-finish side 40 and a finish side 42. Non-finish side 40 is not ordinarily exposed to view after installation, while the finish side 42 is normally seen and contacted by the user after the bathtub has been installed. Non-finish side 40 of rigid shell 24 is coated with a polymeric material coating 18 which also encloses bracket 37. The polymeric material enclosing the bracket distributes the weight of the attached object over adjacent polymeric material. Most preferably, the portion of polymeric material enclosing bracket 37 forms a positive draft angle. The positive draft angle facilitates removal of the molded tub 10 in an upward direction from mold receptor 34 without the mold receptor interfering with removal of molded tub 10 and embedded bracket 12. If a positive draft angle is not formed the result is termed "undercutting" i.e., a surface of embedded bracket 12 would hit a surface of mold receptor 34 during removal, necessitating the sectioning of, or the use of a more complicated mold receptor. Suitably, the molded tub 10 may also include venturi nozzles 14, overflow drain 16, reservoir 20 and drain 22.

Rigid shell 24 is preferably constructed from steel which has been coated with enamel on both its finish side 42 and its non-finish side 40, as disclosed in commonly assigned U.S. Pat. No. 4,664,982 to Genovese et al., the disclosure of which is incorporated by reference herein. Designs suitable for use with the present invention are disclosed in copending, commonly assigned U.S. Design application Ser. No. 365,981 filed on Jun. 14, 1989 and copending, commonly assigned U.S. Design application Ser. No. 07/467,227 filed concurrently herewith. Both are incorporated by reference herein. In another preferred embodiment, the rigid shell 24 may be steel which has not been coated with enamel on its non-finish side 40. Alternatively, rigid shell 24 may be constructed from stainless steel. The rigid shell may be constructed in accordance with the methods and materials disclosed in commonly assigned U.S. patent application Ser. No. 07/400,289 to Kuszaj et al., the disclosure of which is incorporated by reference herein. Alternatively, rigid shell 24 may be constructed of polymeric, fiberglass and/or composite materials as disclosed in commonly assigned U.S. Pat. Nos. 4,844,944 and 4,844,955 to Graefe et al., the disclosures of which are incorporated by reference herein. Likewise, the respective polymeric material 18 and primer suitable for each of the respective rigid shell 24 constructions is also described in detail in the aforementioned U.S. Pat. Nos. 4,664,982, 4,844,944 and 4,844,955, as well as in U.S. application Ser. No. 07/400,289 all of which have been incorporated by reference herein. The term polymeric material 18 and "hardenable material" include all materials suitable for making the molded articles contemplated by the present invention.

Figure 3A:
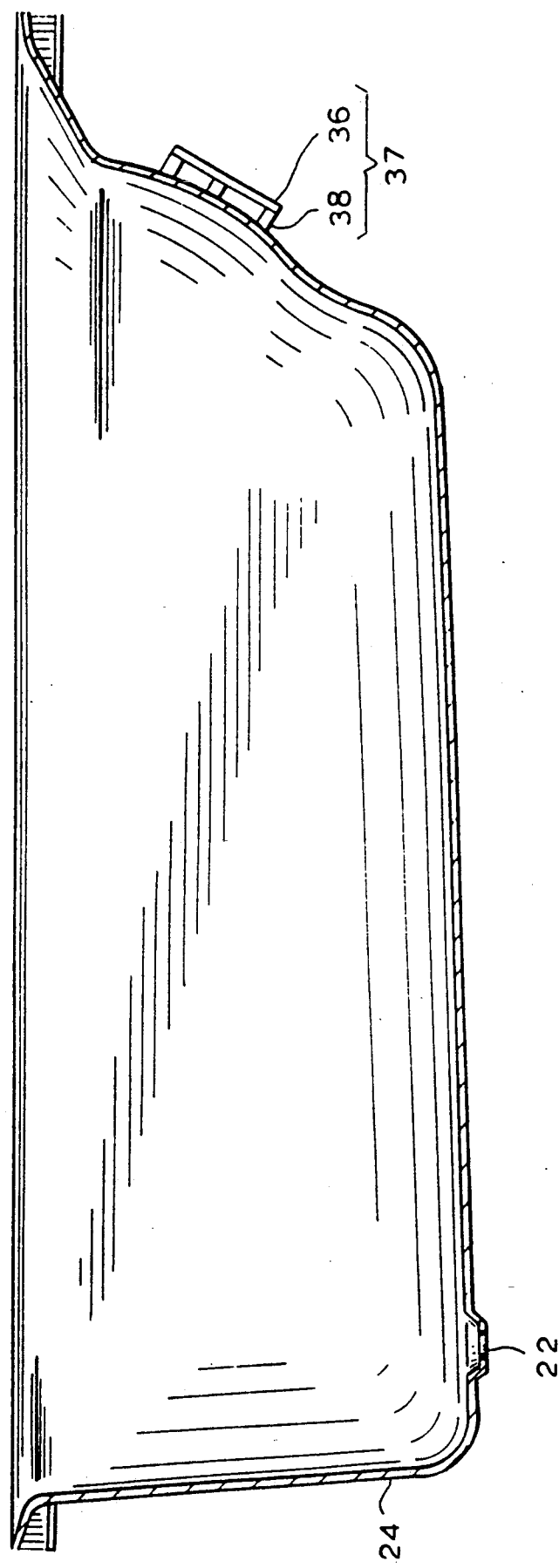
FIG. 3A is a longitudinal, vertical cross-sectional, side elevational view of the rigid shell with an attached bracket which is included in the molded whirlpool tubs illustrated in FIG. 2A.
Figure 3B:
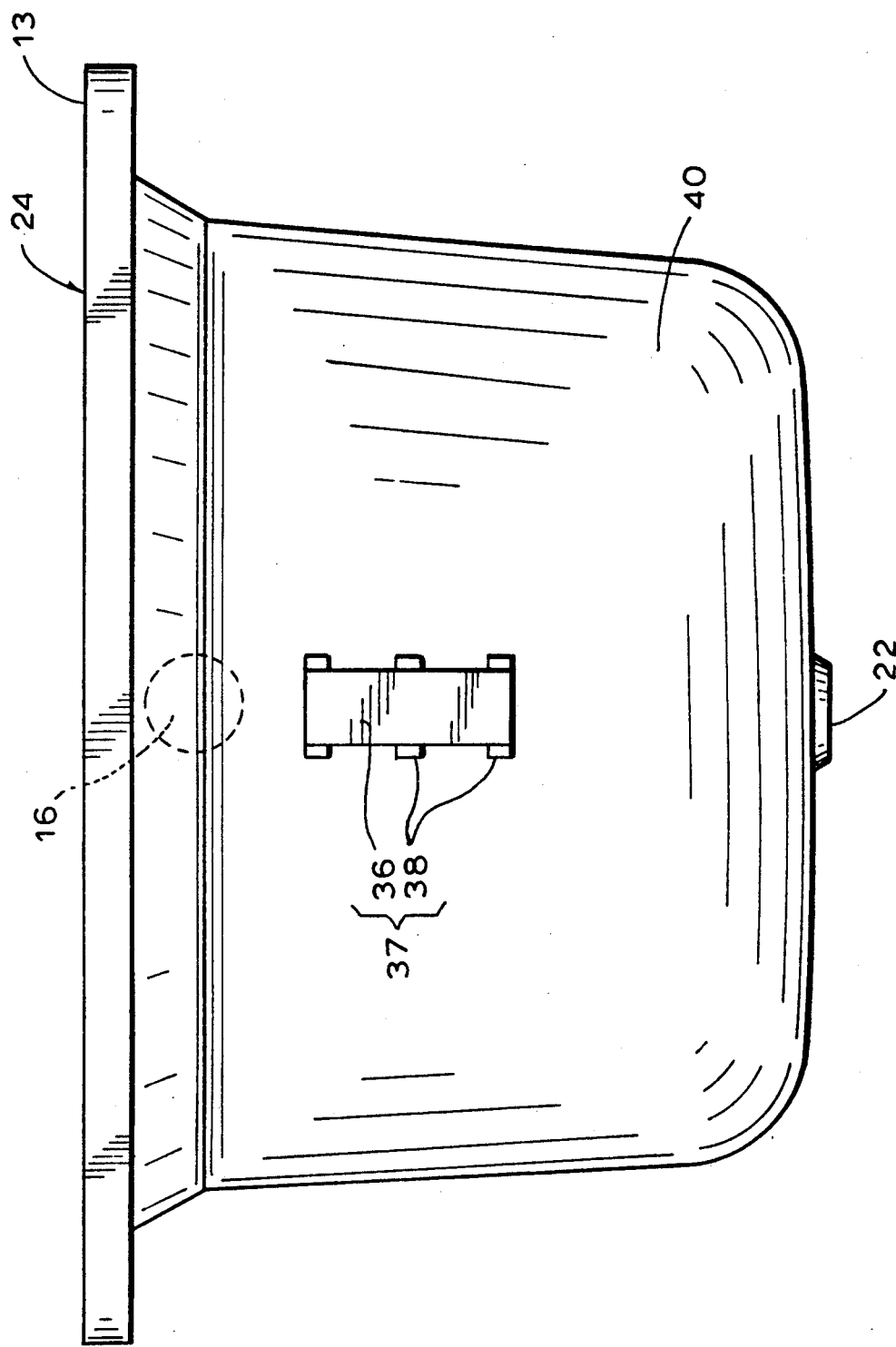
FIG. 3B is a rear elevational view of the rigid shell illustrated in FIG. 3A.

Bracket 37 is preferably constructed from steel. Alternatively, bracket 37 may be composed of any metal, plastic, fiberglass or polymeric material. As illustrated in FIGS. 2B and 3A, bracket 37 includes supports 38 and bracket face 36. Supports 38 affix bracket 37 to rigid shell 24 in a spaced relationship. Preferably, bracket 37 is affixed to the rigid shell 24 by a plurality of supports. The supports are preferably affixed to rigid shell 24 by welding.

Suitably, supports 38 may be attached to rigid shell 24 by gluing, epoxying, brazing, soldering or by mechanical fixing means. It is also contemplated that the bracket may be affixed to the rigid shell, totally or in part by polymeric material 18.

Figure 4A:
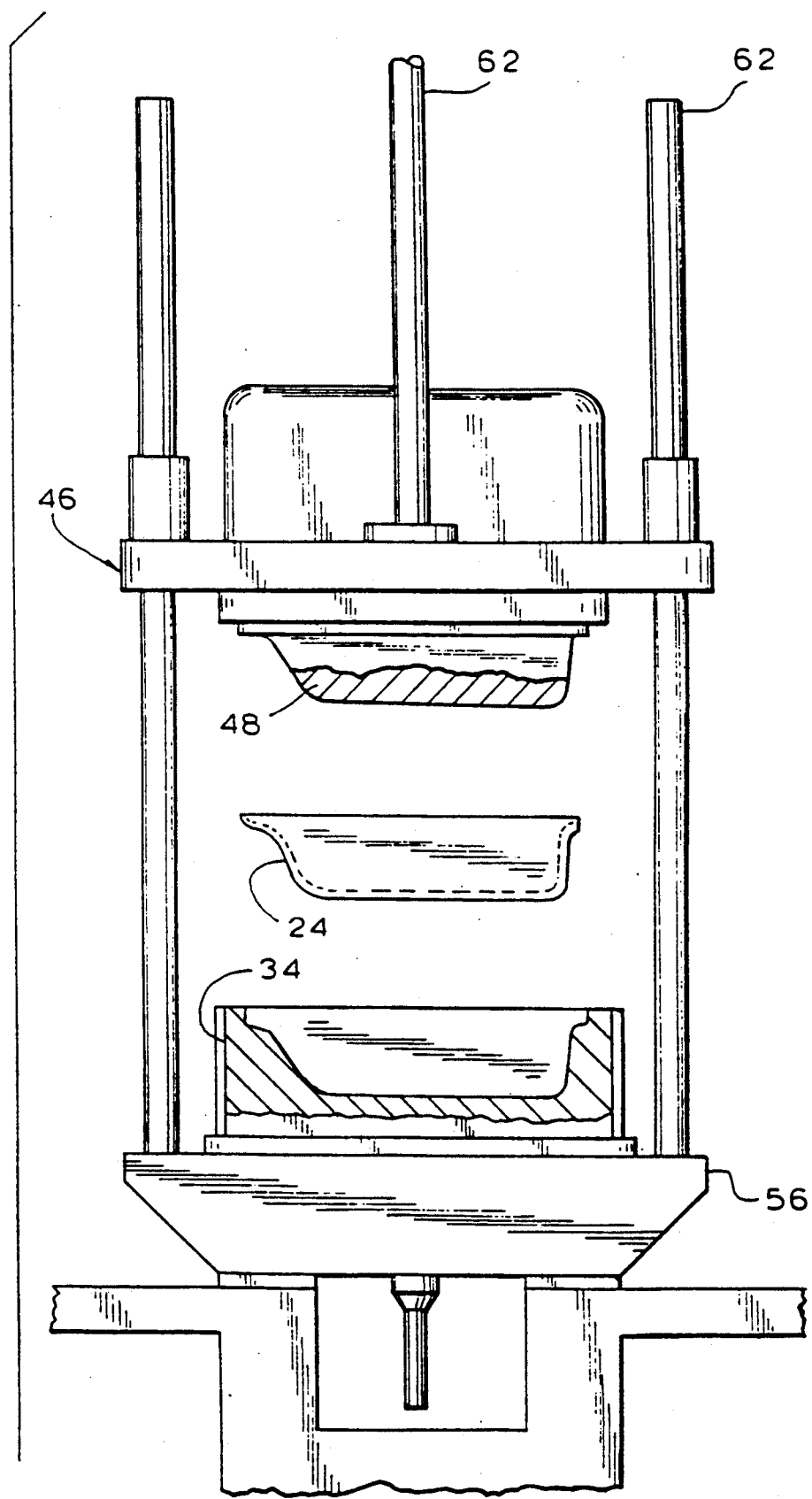
FIG. 4A is a side elevational view illustrating a mold press for use with the present invention.

The molded tub 10 of the present invention is made using a mold press 46 illustrated in FIG. 4A. Mold press 46 includes a platform 56 onto which a mold receptor 34 is mounted. A mix head 58 is positioned below platform 56 for injecting the polymeric material 18 through a conduit in platform 56 and into the mold receptor 34.

Mold receptor 34 is adapted to receive a rigid shell 24 leaving a void between the non-finish side 40 of the rigid shell 24 and the mold receptor face 60. The mold receptor 34 is also adapted for receiving a bracket 37 and molding polymeric material about the bracket 37 and rigid shell 24. Preferably, mold receptor 34 has a recess 32 for molding about bracket 37. Most preferably, recess 32 is designed with a positive draft angle to eliminate undercutting of the embedded bracket and thus facilitate removal of the molded tub 10. Alternatively, if a non-positive draft angle is formed in recess 32 for molding about bracket 37, then mold receptor 34 may be made from two or more components which may separate or otherwise allow removal of the molded tub 10 and embedded bracket 12 from mold receptor 34. Such other removal means may include hydraulic, electrical, mechanical, or sliding means to facilitate removal of molded tub 10.

Figure 4B:
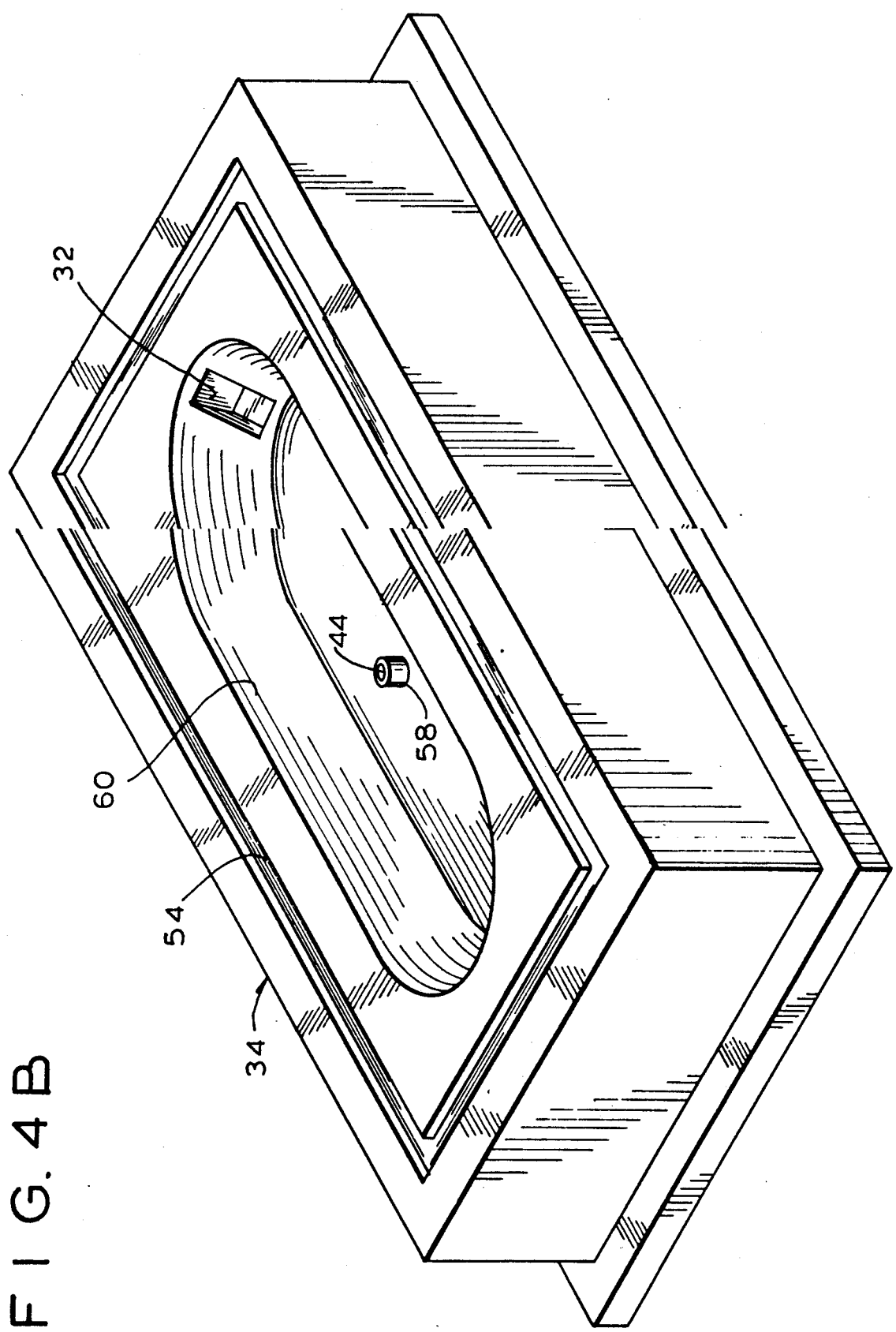
FIG. 4B is a perspective view of a mold receptor.

Preferably, a male mold closing means 48 is adapted for removably engaging the finish side 42 of the rigid shell 24 as illustrated in FIG. 4A. The male mold closing means 48 has an elastomeric surface which snugly fits into the tub reservoir 20, and the top of deck 13 on the finish side 42 of rigid shell 24. The mold closing means sealably retains rigid shell 24 to mold receptor 34, forming a closed cavity between the mold receptor face 60 and the rigid shell's non-finish side 40. Male mold closing means 48 also helps to minimize warp, bowing and distortion of the rigid shell during the injection molding process. A hydraulically operated system 62 lowers and retains the male mold closing means 48 against the rigid shell 24 and mold receptor 34 during the molding process. A mold press 46 which is suitable for molding bathtubs including the present invention is manufactured by Linden Industries, Inc. Preferably, the mold receptor 34 includes a seal 54, as illustrated in FIGS. 4B and 4C. Seals suitable for use with the present invention are described in concurrently filed and commonly assigned U.S. patent application Ser. No. 07/467,771 which is incorporated by reference herein. Other molds suitable, or which may be suitably adapted, for use with the present invention are disclosed in copending and commonly assigned application Ser. No. 07/458,598 filed Dec. 29, 1989 and incorporated by reference herein.

As illustrated in FIGS. 4B and 4C, aperture 44, of mold receptor 34 communicates with a mix head 58 for introducing the hardenable polymeric material into the void created between the mold receptor face 60 and the rigid shell 24. A plurality of ejectors 50 are positioned in the mold receptor 34 which serve to separate and eject the molded tub 10 from the mold receptor 34 after the molding process has been completed. Preferably, the ejectors are cylindrical rods which are hydraulically activated, from a recessed position to an ejected position (shown in FIG. 4B in phantom) and vice versa. Optionally, the mold receptor 34 may be coated with a non-stick material. The non-stick material is preferably a releasing agent, Teflon coating, wax coating or silicon coating.

In the preferred process of making the molded tub 10 of the present invention, rigid shell 24 is loaded onto a mold receptor 34. A void is left between the mold receptor 34 and a side of the rigid shell 24. Preferably, the bracket is affixed to the rigid shell by attachment means prior to the introduction of hardenable material. Preferably, bracket 37 is attached to the rigid shell 24 by welding. However, bracket 37 may also be attached to rigid shell 24 by epoxying, soldering, gluing or mechanically affixing bracket 37 to rigid shell 24.

During the molding process, hardenable polymeric material 18, is introduced from the mix head 58 through aperture 44 in mold receptor 34, filling the mold cavity. The hardenable polymeric material 18 is injected under suitable molding pressure and coats the non-finish side 40 of rigid shell 24 embedding bracket 37 to form the molded tub 10. The polymeric material 18 thus affixes bracket 37 to the non-finish side 40 of rigid shell 24. Most preferably, the polymeric material 18 embedding bracket 37 forms a positive draft angle with mold receptor 34.

After the molded polymeric material 18 has sufficiently hardened, the male mold closing means 48 is retracted. Preferably, the molded tub 10 is lifted partially out of the mold receptor 34 by hydraulic ejectors 50. The ejectors 50 force the molded tub 10 upwards and the molded tub 10 is then manually or mechanically removed from the mold receptor 34.

After the polymeric material 18 has sufficiently hardened, an attachment means, such as blind bolt 26, may be attached to bracket 37 in the manner well known to those skilled in the art, as illustrated and described on pages D15-17 of the Camloc Fasteners catalog.

Thus, while there have been described what are the presently contemplated preferred embodiments of the present invention, further changes and modifications may be made by those skilled in the art without departing from the scope of the invention, and it is contemplated to claim all such changes and modifications.

What is claimed is:

1. A molded article including means for attaching an object thereto, comprising a rigid shell having a finish side and a non-finish side, bracket means supported on the non-finish side of the rigid shell for attaching said object to said shell, and a rigid coating converging the non-finish side of the rigid shell and the bracket means, said coating enclosing the bracket means adjacent the rigid shell to distribute the weight of the object to be attached to the bracket means over the adjacent coated non-finish side of the rigid shell.

2. The molded article of claim 1, wherein the bracket means is affixed to the rigid shell in a spaced relationship.

3. The molded article of claim 1, further including attachment means for attaching the object to a surface of the bracket means.

4. The molded article of claim 3, further including affixation means for affixing said bracket means to the rigid shell in a spaced relationship with the rigid shell.

5. The molded article of claim 4, wherein said affixation means includes a polymeric material.

6. The molded article of claim 1, wherein the bracket means includes a bracket having a plurality of supports.

7. The molded article of claim 6, wherein the supports are affixed to said rigid shell by affixation means selected from the group consisting of glue, epoxy, weld, braze, solder and mechanical fixing means.

8. The molded article of claim 3, wherein said attachment means is selected from the group consisting of threaded protrusion, threaded aperture, sheet metal screw and bayonet fitting.

9. The molded article of claim 8, wherein said threaded protrusion is a blind bolt.

10. The molded article of claim 1, wherein the molded article comprises a sanitary fixture.

11. The molded article of claim 10, wherein the sanitary fixture is a sink, bathtub, whirlpool bathtub or therapeutic tub.

12. The molded article of claim 1, wherein said rigid shell is constructed of a metal, plastic, fiberglass or polymeric material.

13. The molded article of claim 12, wherein said metal is steel or stainless steel.

14. The molded article of claim 1, wherein the bracket is constructed of a metal, plastic, fiberglass or polymeric material.

15. The molded article of claim 1, wherein the shape of the polymeric material enclosing the bracket has a positive draft angle.

16. The molded article of claim 1, wherein the rigid coating is formed from a hardenable a polymeric material.

* * * * *